United States Patent [19]

Zibman

[11] Patent Number: 4,914,701

[45] Date of Patent: Apr. 3, 1990

[54] METHOD AND APPARATUS FOR ENCODING SPEECH

[75] Inventor: Israel B. Zibman, Newton, Mass.

[73] Assignee: GTE Laboratories Incorporated, Waltham, Mass.

[21] Appl. No.: 239,042

[22] Filed: Aug. 29, 1988

Related U.S. Application Data

[63] Continuation of Ser. No. 684,382, Dec. 20, 1984, abandoned.

[51] Int. Cl.⁴ .............................................. G10L 5/00
[52] U.S. Cl. ...................................................... 381/36
[58] Field of Search .................................... 381/36–39, 381/50

[56] References Cited

U.S. PATENT DOCUMENTS

| | | | |
|---|---|---|---|
| 4,241,329 | 12/1980 | Bahler et al. | 381/45 |
| 4,330,689 | 5/1982 | Kang et al. | 179/15.55 R |
| 4,610,022 | 9/1986 | Kitayama | 381/36 |

FOREIGN PATENT DOCUMENTS

| | | |
|---|---|---|
| 0124728 | 11/1984 | European Pat. Off. . |
| 0176243 | 2/1986 | European Pat. Off. . |
| 3102822 | 5/1982 | Fed. Rep. of Germany . |

OTHER PUBLICATIONS

R. Zelinski and P. Noll, "Adaptive Transform Coding of Speech Signals," *IEEE Transactions on Acoustics, Speech, and Signal Processing*, vol. ASSP-25, No. 4, Aug. 1977.

B. N. Suresh Babu, "Performance of an FFT-Based Voice Coding System in Quiet and Noisy Environments," *IEEE Transactions on Acoustics, Speech and Signal Processing*, vol. ASSP-31, No. 5, Oct. 1983, pp. 1323–1327.

James L. Flanagan et al., "Speech Coding", *IEEE Transactions on Communications*, vol. Com-27, No. 4, pp. 710–736, Apr. 1979.

Kang et al., "Mediumband Speech Processor with Baseband Residual Spectrum Encoding", Proceedings 1981 IEEE, International Conference on Acoustics, Speech and Signal Processing, pp. 820–823.

*Primary Examiner*—Emanuel S. Kemeny
*Attorney, Agent, or Firm*—Hamilton, Brook, Smith & Reynolds

[57] ABSTRACT

In a speech encoder a Fourier transform of the speech is provided. The Fourier transform is equalized by normalizing the spectrum coefficients to a curve which approximates the shape of the spectrum. Both the curve and the equalized spectrum are encoded. Preferably, only a baseband of the normalized spectrum is encoded and that baseband is repeated in the decoder. The spectrum is normalized by scaling different regions (subbands) of the spectrum differently to flatten the spectrum.

29 Claims, 3 Drawing Sheets

METHOD AND APPARATUS FOR ENCODING SPEECH

This is a continuation of co-pending application Ser. No. 06/684,382 filed 12/20/84, now abandoned.

FIELD OF THE INVENTION

The present invention relates to digital encoding of speech signals for telecommunications and has particular application to systems having a transmission rate of about 16,000 bits per second.

BACKGROUND

Conventional analog telephone systems are being replaced by digital systems. In digital systems, the analog signals are sampled at a rate of about twice the band width of the analog signals or about eight kilohertz. In one type of system, each sample is then quantized as one of a discrete set of prechosen values and encoded as a digital word which is then transmitted over the telephone lines. With 8 bit digital words, for example, the analog sample is quantized to $2^8$ to 256 levels, each of which is designated by a different 8 bit word. In linear pulse code modulation systems, the 256 possible values of the digital word are linearly related to corresponding analog amplitudes.

Efforts have been made to reduce the number of bits required to encode the speech and obtain a clear decoded speech signal at the receiving end of the system. Because most speech is found at the lower analog signal amplitudes, encoding techniques have been developed which maintain high resolution at the lower amplitudes but which provide lesser resolution at the higher amplitudes. Such an approach has reduced the number of bits required in each word. An example of such an encoding technique is the $\mu$ law technique by which the quantization levels are based on a logarithmic function.

Yet another form of speech encoder, such as that of the linear predictive coding technique, is based on the recognition that speech signals are a combination of two basic signals. The pitch is determined by the vocal cord vibration and that actuating signal is then modified by resonance chambers including the mouth and nasal passages. For a particular group of samples, a digital filter which filters out the formant effects of the resonance chambers can be defined. The Fourier transform of the residual pitch signal can then the obtained and encoded. Because the baseband of the Fourier transform spectrum is approximately repeated in the higher frequencies, only the baseband need be encoded to still obtain reasonably clear speech. At the receiver, a definition of the formant filter and the Fourier transform baseband are decoded. The baseband is repeated to complete the Fourier transform of the pitch signal and the inverse transform of that signal is obtained. By applying the inverse of the decoded filter to the inverse Fourier transform of the repeated baseband signal, the initial speech can be reconstructed.

A major problem of this approach is in defining the formant filter which must be redefined with each window of samples. A complex encoder and decoder is required to obtain transmission rates as low as 16,000 bits per second. Another problem with such systems is that they do not always provide a satisfactory reconstruction of certain formants such as that resulting, for example, from nasal resonance.

DISCLOSURE OF THE INVENTION

In accordance with the present invention, speech with formants is encoded by first performing a Fourier transform of a window of speech. The Fourier transform spectrum is normalized by defining at least one curve of different magnitudes approximating the magnitude of the Fourier transform spectrum, digitally encoding the defined curve and redefining the Fourier transform spectrum relative to the defined curve to provide a flattened (equalized) normalized spectrum. At least a baseband portion of the normalized spectrum is then encoded.

Preferably, the Fourier transform spectrum is normalized by determining the maximum magnitude of the spectrum within each of a plurality of regions of the spectrum, digitally encoding the maximum magnitude of each region and redefining the spectrum by dividing each coefficieint of the spectrum in each region by the maximum magnitude of that region. The spectrum may be normalized first with respect to only a few regions and subsequently with respect to a greater number of subregions. The maximum magnitude in each of the regions and in each of the subregions is encoded. Preferably, the maximums are logarithmically encoded and only the baseband of the normalized spectrum is encoded.

BRIEF DESCRIPTION OF THE DRAWINGS

The foregoing and other objects, features, and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

Figure 1:
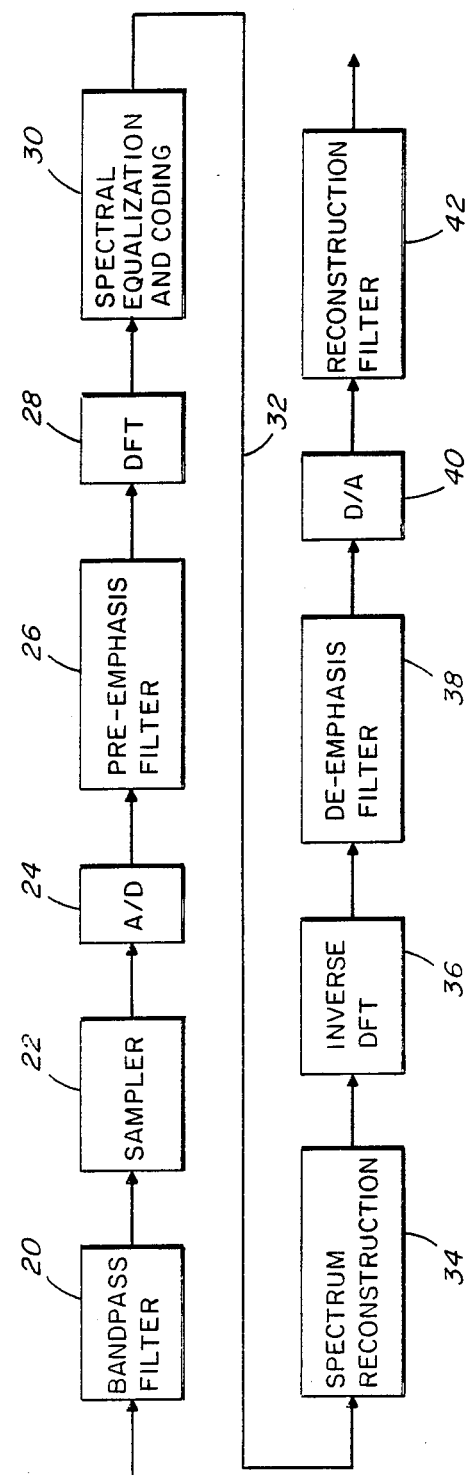
FIG. 1 is a block diagram illustration of an encoder and a decoder embodying the present invention.

A block diagram of the system is shown in FIG. 1. Speech is filtered with a telephone bandpass filter 20 which prevents aliasing when the signal is sampled 8,000 times per second in sampling circuit 22.

A pre-emphasis filter 26 is a single-pole filter. Low frequencies are attenuated by about 5 dB. High frequencies are boosted. The highest frequency (4 kHz) is boosted by about 24 dB. The filter is useful in equalizing the spectrum by reducing the low-pass effects of the initializing filter and the high-frequency attenuation of the lips. The boosting helps to maintain numerical accuracy in the subsequent computation of the Fourier transform.

Speech samples are divided into frames of 180 samples each. This corresponds to one frame every 22.5 ms. A data rate of 16 kb/s is achieved by allocating 360 bits per frame. Using a conventional approach, a discrete Fourier transform (DFT) is performed in circuit 28 once per frame of speech samples. The transform is based on 192 points. A trapezoidal window is used. The first 12 points are equal to the last 12 points of the previous frame, multiplied by 1/13, 2/13, ..., 12/13. The next 168 points are the first 168 samples of the current frame. The last 12 samples of the current frame are multiplied by 12/13, 11/13, ..., 1/13. The outputs of the DFT circuit 28 correspond to frequency bins spaced 41.667 Hz apart. Since the inputs are real, the output is conjugate symmetric. This means that only the positive frequency outputs are needed to carry information. The DFT is computed using algorithms for 64-point fast Fourier transforms (FFTs) and 3-point FFTs. The algorithms may be tailored for real-valued inputs.

The output of the Fourier transform circuit 28 is a sequence of coefficients which indicate the magnitude and phase of the Fourier transform spectrum at each of 96 frequencies spaced 41.667 hertz apart. The magnitude spectrum of the Fourier transform output is illustrated as a continuous function in FIG. 2 but it is recognized that the transform circuit 28 would actually provide only 96 incremental outputs.

Figure 2:
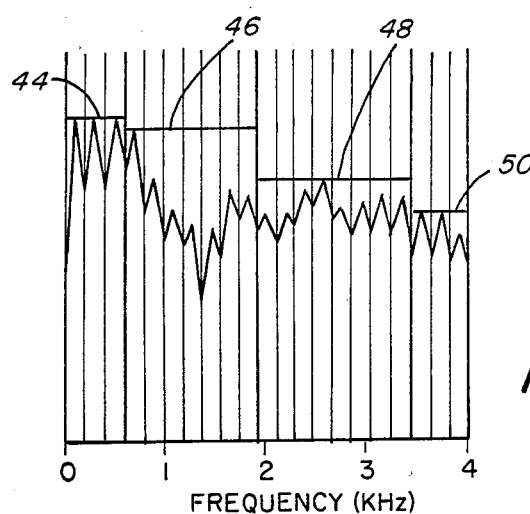
FIG. 2 is an example of a magnitude spectrum of a window of speech illustrating principles of the present invention.

In accordance with the present invention, the Fourier transform spectrum of the full speech within a selected window is equalized and encoded in circuit 30 in a manner which will be discussed below. The resultant digital signal can be transmitted at 16,000 bits per second over a line 32 to a receiver. At the receiver the full spectrum of FIG. 2 is reconstructed in circuit 34. The inverse Fourier transform is performed in circuit 36 and applied through a deemphasis filter 38. That signal is then converted to analog form in digital to analog converter 40. Final filtering in filter 42 provides clear speech to the listener.

In a preferred system, a pipelined multiprocessor architecture as described in U.S. patent application Ser. No. 551,612, filed Nov. 14, 1983 by Israel Zibman and Nigel Morgan for a Pipeline Computer is employed. One microcomputer is dedicated to the analog to digital conversion with preemphasis filtering, one is dedicated to the forward Fourier transform and a third is dedicated to the spectral equalization and coding. Similarly, in the receiver, one microcomputer is dedicated to spectrum reconstruction, another to inverse Fourier transform and a third to digital to analog conversion with deemphasis filtering.

Figure 4:
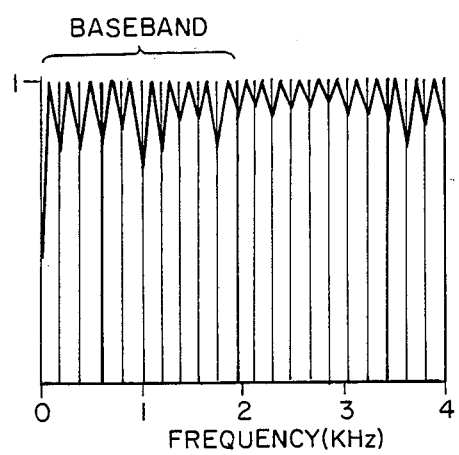
FIG. 4 is an example spectrum normalized from that of FIG. 3 in subbands.

The spectral equalization and encoding technique of the present invention is based on the recognition that the Fourier transform of the total signal includes a relatively flat spectrum of the pitch illustrated in FIG. 4 shaped by formant signals. In the present system, the signal of FIG. 4 is obtained by normalizing the spectrum of FIG. 2 to at least one curve which can be itself encoded separate from the residual spectrum of FIG. 4.

In the preferred system, the shape of the spectrum is determind by a two-step process. This process actually encodes the shape of the entire 100 to 3,800 Hz spectrum since this is useful in the baseband coding. In the first step, the spectrum is divided into four regions illustrated in FIG. 2:
125-583 Hz
625-1959 Hz
2000-3416 Hz
3468-3833 Hz These regions correspond roughly to the usual locations of the first four formants. The dynamic range of the magnitudes of the spectral coefficients is much smaller within each of these regions than in the spectrum as a whole. For voiced phonemes the peak magnitude near 250 Hz can be 30 dB above the magnitude near 3,800 Hz. The first step of spectal normalization is performed by finding the peak magnitudes within each region, quantizing these peaks to 5 bits each with a logarithmic quantizer, and dividing each spectral coefficient by the quantized peak in itss region. The result is a vector of spectral coefficients with maximum magnitude equal to unity. The division into regions should result in the spectral coefficients being reasonably uniformly distributedwithin the complex disc of radius one.

The second step extracts more detailed structure. The spectrum is divided into equal bands, or subregions of about 165 Hz each. The peak magnitude within each band is located and quantized to 3 bits. The complex spectral coefficients within the band are divided by the quantized magnitude and coded to 6 bits each using a hexagonal quantizer. This coding preserves phase information that is important for reconstruction of frame boundaries.

The specifics of this approach are illustrated with reference to FIGS. 2 through 6. Within each of the four formant regions, the spectrum is normalized to a curve which in this case is selected as a horizontal line through the peak magnitude of the spectrum in each region. These curves are shown as lines 44, 46, 48, and 50. The peak magnitude of the complex numbers in each region is determined and encoded to five bits at unit 52 of FIG. 6 by finding a value k which is encoded such that the peak magnitude is between $162 \times 2^{12(k-1)/32}$ and $162 \times 2^{12k/32}$. This results in logarithmic encoding of the peak magnitude. The four k values, each encoded in five bits, make up a total of 20 bits from the formant encoder which are the most significant bits of the transmitted code for the window. All spectral coefficients in each of the four regions are then divided by the $162 \times 2^{12k/32}$ in the spectral normalization unit 54. By this method, all of the resultant magnitudes, illustrated in FIG. 3, are less than 1.

Figure 3:
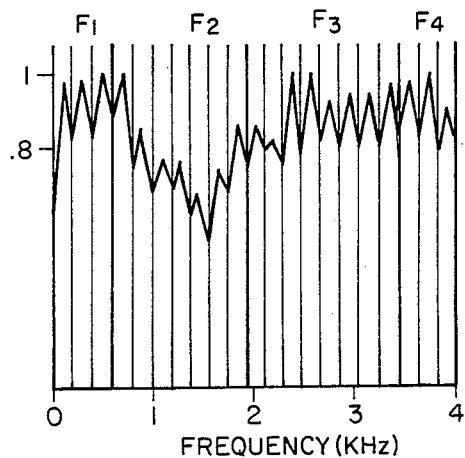
FIG. 3 is an example spectrum normalized from the spectrum of FIG. 2 using four formant regions.

Next, the normalized coefficients output from unit 54 are grouped into 20 subregions of four and two subregions of five illustrated in FIG. 3. The peak magnitude in each of these subregions is determined and encoded to three bits with a logarithmic quantizer in unit 56. The peak is always coded to the next largest value. The three bits from each of the 22 subregions provide an additional 66 bits of the final signal for the window. Each output within a subregion is multiplied by the reciprocal of the quantized magnitude in the sample normalization unit 58, thus ensuring that all outputs illustrated in FIG. 4 remain less than 1.

Figure 5:
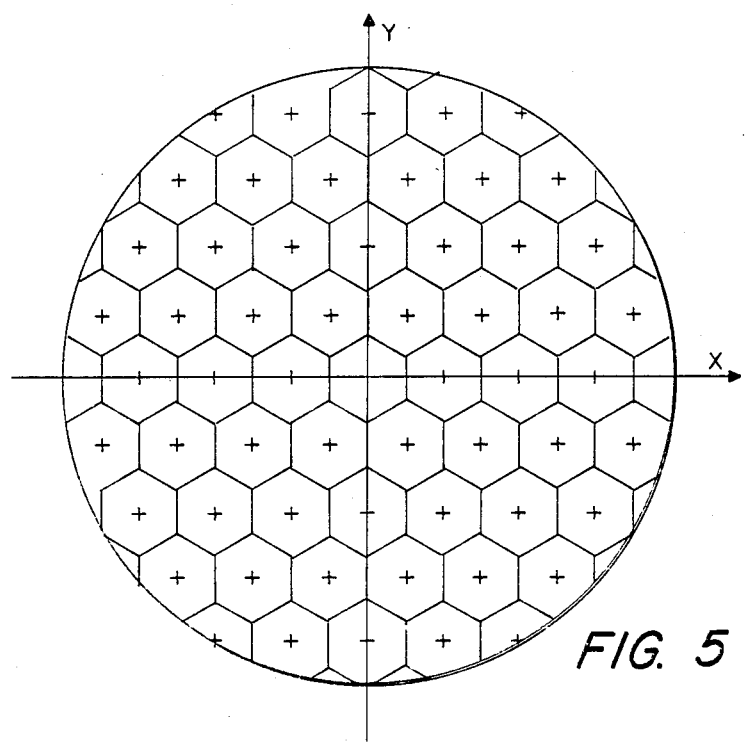
FIG. 5 schematically illustrates a quantizer for complex values of the normalized spectrum.
Figure 6:
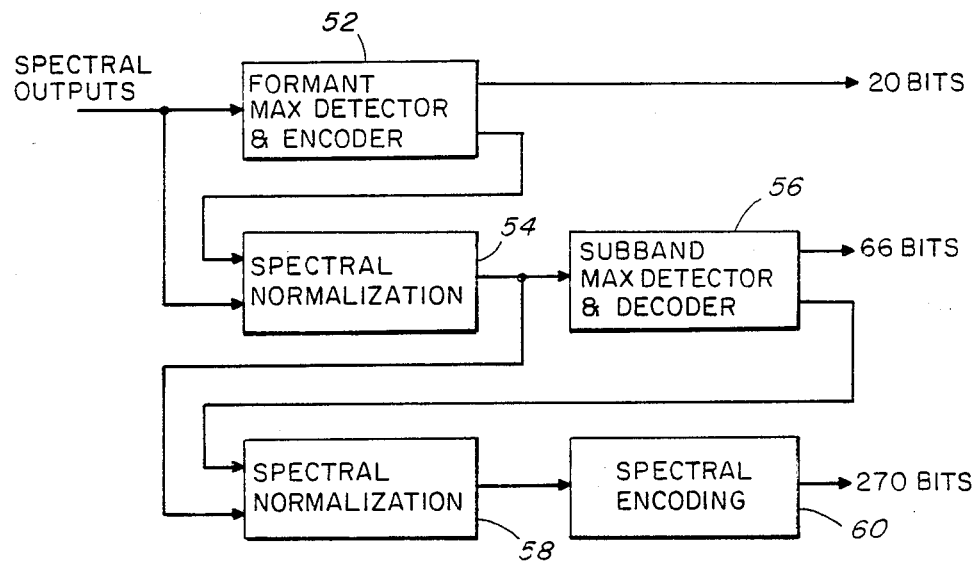
FIG. 6 is a block diagram illustration of the spectral equalization encoding circuit of FIG. 1.

Each complex output from the baseband of 125 Hz to 1959 Hz of the normalized spectrum of FIG. 4 is coded to six bits with the two dimensional quantizer and encoder 60. The two-dimensional quantizer is formed by dividing a complex disc of radius one into hexagons as shown in FIG. 5. The x, y coordinates are radially warped by an exponential function to approximate a logarithmic coding of the magnitude. All points within a hexagon are quantized to the coordinates of the center of the hexagon. As a result, coefficients of large magnitude are coded to better phase resolution than coefficients of small magnitude. Actual quantization is done by table lookup, but efficient computational algorithms are possible.

The bit allocation for a single frame may be summarized as follows:

| Formant region scale factors | 4 × 5 bits each = | 20 bits |
|---|---|---|
| Subregion scale factors | 22 × 3 bits each = | 66 bits |
| Baseband components | 45 × 6 bits each = | 270 bits |
| | TOTAL | 356 bits |

In a practical 16-kb/s transmission system, this allows 4 bits per frame for overhead functions, such as frame synchronization. The actual coding transformations, bit allocations, and subband sizes may be changed as the coder is optimized for different applications.

All normalization factors (four at 5 bits each, 22 at 3 bits each) and the coded normalized baseband coefficients (45 at 6 bits) are transmitted. At the receiver the baseband is decoded and duplicated into the upper frequency range. The normalization factors are applied onto the spectrum to restore the original shape. Specifically, in the receiver, the inverse Fourier Transform Inputs 0 to 2 and 93 to 96 are set to zero. The normalized complex coefficients for Inputs 3 to 47 are reconstructed from the quantizer codes by table lookup. They are duplicated into Positions 48 to 92. This duplication is the nonlinear regeneration step. The scale factors for the subregions and larger regions are then applied. The inverse transform is computed in unit 36. The effects of the windowing are removed by adding the last 12 points of the previous inverse transform to the first 12 points from the current inverse transform. The speech now passes through filter 38, which is an inverse to the preemphasis filter and which attenuates the high frequencies, removing the effects of the treble boost and reducing high-frequency quantization noise. The outputs are converted to analog with a 12-bit linear analog to digital converter 40.

The baseband which is repeated in the spectrum reconstruction has been described as being a band of lower frequencies. However, the baseband may include any range of frequencies within the spectrum. For some sounds where higher energy levels are found in the higher frequencies, a baseband of the higher frequencies is preferred.

It should be noted that the baseband suffers degradations only from quantization errors. The reconstruction of the upper frequencies is only as good as the model and the shaping information. However, by ensuring that at least some coefficient in each 165-Hz band of the normalized baseband is at full scale, each formant is excited at approximately the right frequency. This is an improvement over baseband residual excitation in which some parts of the spectrum may have too little energy. The reduction in computation complexity due to peak finding and scaling instead of linear prediction analysis and filter is very significant. In a modification of the subband transform coding just described, one could code the baseband as described above, but code only some measure of energy for the higher frequencies. Frequency translation of the baseband regenerates the fine structure of the upper spectrum.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. A speech encoder comprising:
   Fourier transform means for performing a Fourier transform of a window of speech with formants to generate a Fourier transform spectrum;
   normalizing means for defining from the Fourier transform spectrum at least one curve of different magnitudes approximating different magnitudes of the Fourier transform spectrum across the spectrum, for digitally encoding the at least one defined curve and for defining the Fourier transform spectrum relative to the at least one defined curve to provide a normalized spectrum; and
   means for encoding at least a portion of the normalized spectrum.

2. A speech encoder as claimed in claim 1 wherein the normalizing means comprises:
   means for determining the maximum magnitude of Fourier transform spectrum within each of a plurality of regions of the spectrum;
   means for digitally encoding the maximum magnitude of each region; and
   means for scaling each coefficient of the Fourier transform spectrum in each region to the maximum magnitude of each region to provide a first set of normalized outputs.

3. A speech encoder as claimed in claim 2 wherein the normalizing means further comprises:
   means for determining the maximum magnitude of the first set of normalized outputs in each of a plurality of subregions of the spectrum;
   means for digitally encoding the maximum magnitude of each subregion; and
   means for scaling each output of the first set of normalized outputs to the maximum magnitude of each subregion to provide a second set of normalized outputs.

4. A speech encoder as claimed in claim 3 wherein each of the maximum magnitudes is logarithmically encoded.

5. A speech encoder as claimed in claim 3 wherein the maximum magnitude is determined for each of four regions corresponding to the first four formants.

6. A speech encoder as claimed in claim 2 wherein only a baseband of the normalized spectrum is encoded.

7. A speech encoder comprising:
   means for sampling a speech signal;
   an analog to digital converter for providing digital representations of the speech samples;
   a preemphasis filter;
   Fourier transform means for performing a Fourier transform of a window of digital speech samples to generate a Fourier transform spectrum;
   means for determining the maximum magnitude of the Fourier transform spectrum within each of a plurality of regions of the spectrum;
   means for digitally encoding the maximum magnitude of each region;
   means for dividing each coefficient of the Fourier spectrum in each region by the maximum magnitude of each region to provide a first set of normalized outputs;
   means for determining the maximum magnitude of the first set of normalized outputs in each of a plurality of subregions of the spectrum;

means for digitally encoding the maximum magnitude of each subregion;

means for dividing each output of the first set of normalized outputs by the maximum magnitude of each subregion to provide a second set of normalized outputs; and means for encoding a baseband of the second set of normalized outputs.

8. A method of encoding speech comprising:

performing a Fourier transform of a window of speech with formants to generate a Fourier transform spectrum;

providing a normalized spectrum by defining from the Fourier transform spectrum at least one curve of different magnitudes approximately different magnitudes of the Fourier transform spectrum across the spectrum, digitally encoding the at least one defined curve and defining the Fourier transform spectrum relative to the at least one defined curve; and encoding at least a portion of the normalized spectrum.

9. A method as claimed in claim 8 wherein the normalized spectrum is provided by:

determining a maximum magnitude of the Fourier transform within each of a plurality of regions of the spectrum;

digitally encoding the maximum magnitude of each region; and scaling each coefficient of the Fourier spectrum in each region to the maximum magnitude of each region.

10. A method as claimed in claim 9 wherein the normalized spectrum is provided by further:

determining the maximum magnitude of the first set of normalized outputs in each of a plurality of subregions of the spectrum;

digitally encoding the maximum magnitude of each subregion; and scaling each output of the first set of normalized outputs to the maximum magnitude of each subregion to provide a second set of normalized outputs.

11. A method as claimed in claim 10 wherein each of the maximum magnitudes is logarithmically encoded.

12. A method as claimed in claim 10 wherein the maximum magnitudes are determind for four regions corresponding to the first four formants.

13. A method as claimed in claim 8 wherein only a baseband of the normalized spectrum is encoded.

14. A speech encoder comprising:

transform means for performing a transform of an incoming speech signal with formants to generate a transform spectrum which varies significantly in magnitude across the spectrum;

equalizing means for modifying the transform spectrum to provide a substantially flat spectrum and for encoding a function derived from the transform spectrum by which the transform spectrum is modified; and means for encoding at least a portion of the equalized spectrum.

15. A speech encoder as claimed in claim 14 wherein the transform means performs a Fourier transform.

16. A speech encoder as claimed in claim 15 wherein only a baseband of the equalized spectrum is encoded.

17. A speech encoder as claimed in claim 14 wherein only a baseband of the equalized spectrum is encoded.

18. A speech encoder comprising:

transform means for performing a transform of a window of speech with formants to generate a transform spectrum;

normalizing means for defining a magnitude relative to each of a plurality of regions of the transform spectrum and for scaling each coefficient of the transform spectrum, in each region of at least a portion of the spectrum, to the defined magnitude of the region of provide a normalized spectrum; and means for encoding the defined magnitudes and at least a portion of the normalized spectrum.

19. A speech encoder as claimed in claim 18 wherein the transform means performs a Fourier transform.

20. A method of encoding speech comprising:

performing a transform of an incoming speech signal to generate a transform spectrum which varies significantly in magnitude across the spectrum;

modifying the transform spectrum by a function derived from the transform spectrum to provide a substantially flat spectrum; and encoding the function derived from the transform spectrum by which the transform spectrum is modified and encoding at least a portion of the modified spectrum.

21. A method as claimed in claim 20 wherein the transform performed is a Fourier transform.

22. A method of encoding speech comprising:

performing a transform of a window of speech with formants to generate a transform spectrum;

defining a magnitude relative to each of a plurality of regions of the transform spectrum and scaling each coefficient of the transform spectrum, in each region of at least a portion of the spectrum, to the defined magnitude of the region; and encoding the defined magnitudes and at least a portion of the scaled coefficients of the transform spectrum.

23. A method as claimed in claim 21 wherein the transform performed is a Fourier transform.

24. A speech encoder as claimed in claim 1 wherein the means for encoding at least a portion of the normalized spectrum encodes phase and amplitude information.

25. A method as claimed in claim 8 wherein the step of encoding at least a portion of the normalized spectrum includes encoding phase and amplitude information.

26. A speech encoder as claimed in claim 14 wherein the means for encoding at least a portion of the equalized spectrum encodes both phase and amplitude information.

27. A speech encoder as claimed in claim 18 wherein the means for encoding the normalized spectrum encodes both phase and amplitude information.

28. A method as claimed in claim 20 wherein the step of encoding at least a portion of the modified spectrum includes encoding both phase and amplitude information.

29. A method as claimed in claim 22 wherein the step of encoding at least a portion of the scaled coefficients of the transform spectrum includes encoding both phase and amplitude information.

* * * * *